(12) United States Patent
Saunders et al.

(10) Patent No.: US 8,423,973 B2
(45) Date of Patent: Apr. 16, 2013

(54) INSTRUMENTING AN APPLICATION WITH FLEXIBLE TRACERS TO PROVIDE CORRELATION DATA AND METRICS

(75) Inventors: Roger Clive Saunders, Abingdon (GB); Michael Goulet, Newton, MA (US); Vashistha Singh, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 963 days.

(21) Appl. No.: 12/437,834

(22) Filed: May 8, 2009

(65) Prior Publication Data

US 2010/0287541 A1   Nov. 11, 2010

(51) Int. Cl.
*G06F 9/44* (2006.01)
(52) U.S. Cl.
USPC .......................................................... 717/130
(58) Field of Classification Search .................. None
See application file for complete search history.

(56) References Cited

U.S. PATENT DOCUMENTS

| | | |
|---|---|---|
| 6,260,187 B1 | 7/2001 | Cirne |
| 6,968,540 B2 | 11/2005 | Beck et al. |
| 2004/0075690 A1 | 4/2004 | Cirne |
| 2004/0078691 A1 | 4/2004 | Cirne et al. |
| 2005/0039171 A1* | 2/2005 | Avakian et al. ............... 717/127 |
| 2005/0223048 A1 | 10/2005 | Smith et al. |
| 2005/0223367 A1 | 10/2005 | Smith et al. |
| 2007/0180439 A1* | 8/2007 | Sundararajan et al. ....... 717/158 |
| 2009/0089766 A1 | 4/2009 | Day et al. |

OTHER PUBLICATIONS

Introscope SYSVIEW Transaction Tracing Integration CA World Demo Script, CA World Conference, Las Vegas, Nevada, Nov. 16-20, 2008.

* cited by examiner

*Primary Examiner* — Idriss N Alrobaye
*Assistant Examiner* — Ronald Modo
(74) *Attorney, Agent, or Firm* — Vierra Magen Marcus LLP (57) ABSTRACT

A technique for flexibly adding instrumentation to an application. A file is created which includes a dynamic parameter syntax. The file identifies a trace point in the application, such as a method, and the syntax includes one or more parameters which are evaluated when the method is invoked. The parameters can be used to provide cross-process correlation and/or performance metrics. A client process which calls a server process can include the parameter in a message header according to any desired transport protocol, such as HTTP or JMS. Different application protocols and implementation can be accommodated to track a transaction which executes on different platforms. The dynamic parameter syntax is interpreted as uncompiled code and is designed to be added by the user in the field to augment a package of pre-built instrumentation software after the package has been deployed.

16 Claims, 7 Drawing Sheets

INSTRUMENTING AN APPLICATION WITH FLEXIBLE TRACERS TO PROVIDE CORRELATION DATA AND METRICS

BACKGROUND OF THE INVENTION

1. Field of the Invention

The present invention is directed to technology for monitoring applications in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

For example, instrumentation can be added to an application, middleware or other software, to provide a trace, which is a detailed record of the steps a computer program executes. The trace identifies each method that is invoked in a transaction and can provide data which is associated with the method, such as the start and stop time. However, the instrumentation is typically predefined so that it cannot be easily modified after it is deployed. As a result, there is difficulty in adapting the instrumentation to accommodate different protocols and add new capabilities.

SUMMARY OF THE INVENTION

Techniques are provided for flexibly adding instrumentation to accommodate different protocols and add new capabilities.

In one embodiment, a computer-implemented method is provided for instrumenting an application. The method includes: (a) providing uncompiled instructions to add at least one trace point in the application and to evaluate at least one parameter associated with the at least one trace point, (b) creating an instrumented application based on: (i) the compiled code of the application and (ii) the uncompiled instructions, (c) executing the instrumented application, (d) when the at least one trace point is invoked in the application, in a client process of a transaction, interpreting the uncompiled instructions to evaluate the at least one parameter, (e) providing the at least one parameter in a call from the first process to a server process, and (f) communicating the at least one parameter to a manager, the manager uses the at least one parameter to report results which correlate the client and server processes as being part of the transaction.

In another embodiment, at least one processor readable storage device having processor readable code embodied thereon is provided for programming at least one processor to perform a method for instrumenting an application. The method includes: (a) providing uncompiled instructions to add at least one trace point in the application and to evaluate at least one parameter associated with the at least one trace point, (b) creating an instrumented application based on: (i) the compiled code of the application and (ii) the uncompiled instructions, (c) executing the instrumented application, (d) when the at least one trace point is invoked in the application, in a transaction, interpreting the uncompiled instructions to evaluate the at least one parameter, and (e) communicating the at least one parameter to a manager, the manager uses the at least one parameter to report metrics of the transaction.

In another embodiment, a computer-implemented method for correlating first and second processes includes receiving a correlation identifier from a first agent at a first computing system, where the first process executes at the first computing system by interpreting compiled instructions at the first computing system, and the correlation identifier is provided by interpreting uncompiled instructions at the first computing system when at least one trace point is invoked in the first process, and where the first process provides, to the second process, a call which includes the correlation identifier. The method further includes receiving, from a second agent at a second computing system, the correlation identifier as provided in the call, where the second process executes at the second computing. The method further includes providing a report, based on the correlation identifiers received from the first and second agents, which identifies the first and second processes as being part of a common transaction.

Corresponding methods, systems and computer- or processor-readable storage devices which have executable code for performing the methods provided herein may also be provided.

DETAILED DESCRIPTION

The present invention provides techniques for flexibly adding instrumentation to an application.

Figure 1:
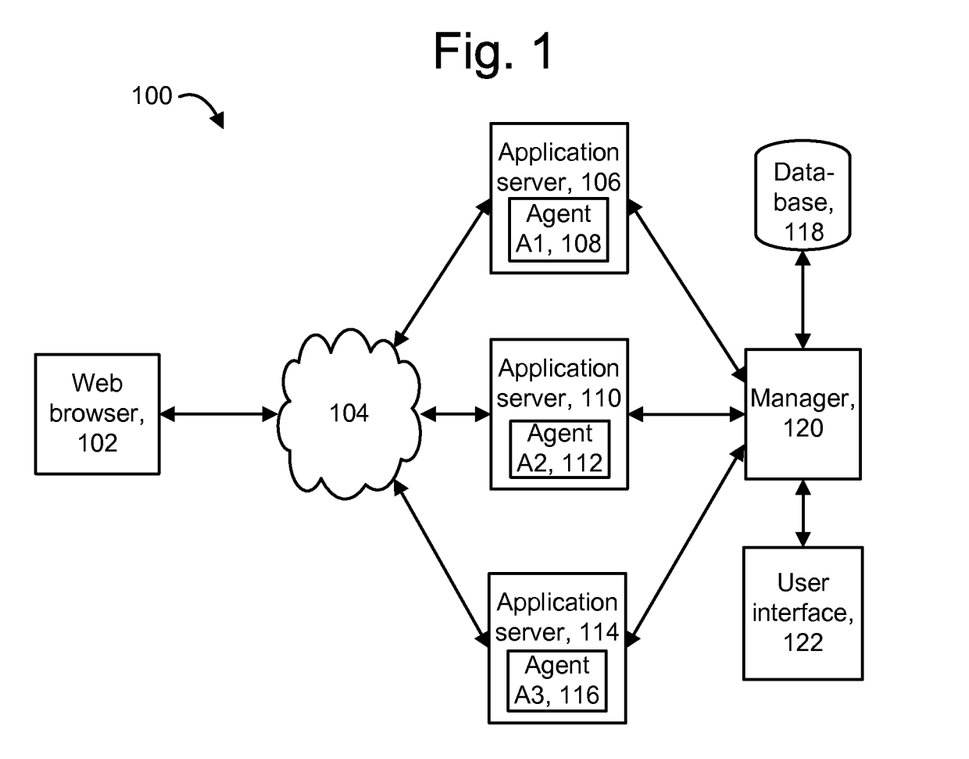
FIG. 1 depicts a network in which different computer systems run instrumented applications and report to a manager.

FIG. 1 depicts a network 100 in which different computer systems run instrumented applications and report to a manager. Example computer systems 106, 110 and 114 may include application servers or any other type of computer system having a processor for executing code to achieve a desired functionality. The computer systems can be located remotely from one another or co-located. The computer systems 106, 110 and 114 communicate with a local manager computer 120, in this example. The manager computer 120 could alternatively be remote from the computer systems 106, 110 and 114, in which case communication may occur via the network cloud 104.

For example, a corporation running an enterprise application such as a web-based e-commerce application may employ a number of application servers at one location for load balancing. Requests from users, such as from an example web browser 102 of a user, are received via a network cloud 104 such as the Internet, and can be routed to any of the computer systems 106, 110 and 114. The web browser 102 typically accesses the network cloud 104 via an Internet Service Provider, not shown. Agent software running on the computer systems 106, 110 and 114, denoted by Agent A1 (108), Agent A2 (112) and Agent A3 (116), respectively, gathers information from an application, middleware or other software, running on the respective computer systems, in one possible approach, using instrumentation such as byte code instrumentation. The agents essentially live in the computer system being monitored and provide a data acquisition point. The agents organize and optimize the data communicated to the manager 120, and are aware of the software executing on the local computer system with which they are associated.

Various approaches are known for instrumenting software to monitor its execution. For example, an approach for instrumenting byte code can be found in U.S. Pat. No. 6,260,187, titled "System For Modifying Object Oriented Code," incorporated herein by reference. An example of tracing is discussed in U.S. Patent Application Publication No. 2004/0078691, titled "Transaction Tracer," and incorporated herein by reference. In one approach discussed therein, object code or bytecode of an application to be monitored is instrumented with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 120, or process the information locally, such as to determine whether the information indicates an abnormal condition. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed.

The manager 120 can be provided on a separate computer system such as a workstation which communicates with a user interface 122, such as a monitor, to report results, such as by displaying information based on data received from the agents. The manager can also access a database 118 to store the data received from the agents. In the example provided, the computer systems can communicate with the manager 120 without accessing the network cloud 104. For example, the communication may occur via a local area network. In other designs, the manager 120 can receive data from the agents of a number of computer systems via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, similarly can employ agents and managers for managing their systems. For example, a bank may use an application for processing checks and credit accounts. Moreover, in addition to the multi-computer system arrangements mentioned, a single computer system can be monitored as well with one or more agents.

Generally, the application servers and the manager are computing devices that include one or more processors in communication with one or more processor readable storage devices, such as RAM, ROM, hard disk drives, floppy disk drives, CD ROMS, DVDs, flash memory, etc. The one or more processor readable storage devices have processor readable code embodied thereon for programming at least one processor to perform a method for instrumenting an application as described herein.

Figure 2:
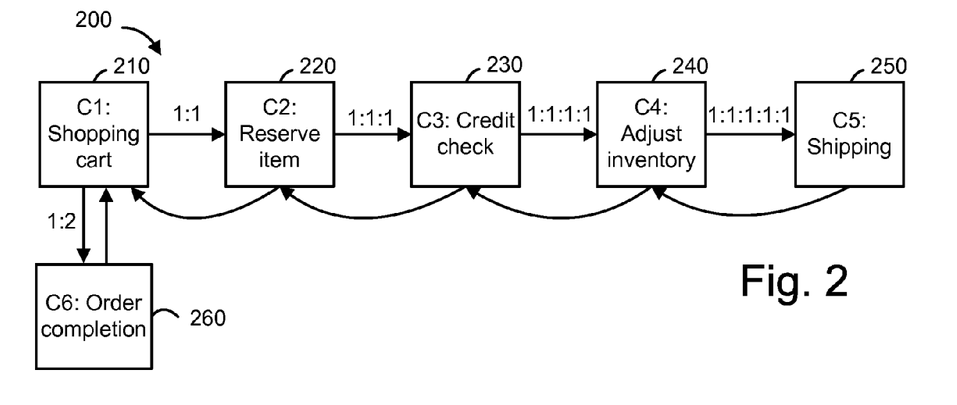
FIG. 2 depicts an example sequence of components invoked in a transaction.

FIG. 2 depicts an example sequence of components invoked in a transaction. Component oriented programming models are useful in allowing the programmer to assemble an application or other program from building blocks referred to as components. Each component can perform a specific function which fits in with an overall functionality of the software. One example of a component oriented programming model is J2EE, which can employ components such as a Java Server Page, an Enterprise Java Bean, a servlet, and a Java Database Connectivity component. Another example of component is a Microsoft .NET component. However, other component oriented programming models may also be used. Moreover, the programming model need not be object oriented.

The specific example shown refers to a web-based e-commerce application or service which allows users to order items. As can be seen, the components may correlate with business logic or e-commerce steps in the application. Together, the components comprise an execution flow such as a transaction 200. Each component performs an operation in the service, and can includes one or more methods and processes. A component C1 (210) provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. The component C1 (210) calls a component C2 (220), which reserves the item which the user wishes to purchase. This is done so that the item will not be sold to another user while the transaction is still pending. Once finished, the component C2 (220) calls a component C3 (230), which checks the user's credit card information to authorize and validate the purchase. This typically involves communicating with an external server that is managed by a credit card clearinghouse. Once the component C3 (230) successfully finishes, thereby approving the purchase, the component C3 (230) calls a component C4 (240) which adjusts an inventory by decrementing the quantity of the item purchased. The component C4 (240) calls a component C5 (250) which arranges for the item to be shipped, such as by contacting a warehouse, where a shipping label is printed and an operator is prompted to manually locate and pack the item. Once the components C2-C5 have executed, program control returns to the component C1 (210), which calls an order completion component C6 (260) to confirm the purchase to the user such as by providing an order confirmation number and a tracking number, e.g., in a confirmation e-mail and web page. In one possible implementation, C1 and C6 are Java Server Pages and C2-C5 are Enterprise JavaBeans.

Note that a first component can continue executing after calling another component, which begins executing, in an asynchronous, multi-thread or multi-process mode, or can temporarily pause until the called component has finished executing, in a synchronous, single-thread or single-process mode. For example, the component C1 (210) can pause while the components C2-C5 execute. Moreover, a given component may be invoked more than once during a transaction. For example, assume the user has purchased multiple items that are stored at different warehouses. In this case, the component C5 may execute repeatedly, contacting a different warehouse each time. The execution flow among the components can be ascertained by instrumentation and reported to a user via a user interface.

Moreover, for each call, a sequence identifier can be provided which indicates a sequence in which components are called. The sequence identifier can be expressed, e.g., by numbers separate by colons. Each number represents a sequence of the associated calling component in a transaction. For example, the sequence identifier 1:1 in the call from C1 to C2 indicates that C1 is the first component in a transaction and C2 is the first component called by C1. The sequence identifier 1:1:1 in the call from C2 to C3 indicates that C2 is the second component in the transaction and C3 is the first component called by C2. The sequence identifier 1:1:1:1 in the call from C3 to C4 indicates that C3 is the third component in the transaction and C4 is the first component called by C3. The sequence identifier 1:1:1:1:1 in the call from C4 to C5 indicates that C4 is the fourth component in the transaction and C5 is the first component called by C4. Finally, the sequence identifier 1:2 in the call from C1 to C6 indicates that C1 is the first component in the transaction and C6 is the second component called by C1. The sequence identifier can be passed in calls, such as in headers, and reported to the manager, to allow the caller-callee relationship among component to be determined by the manager.

Figure 3A:
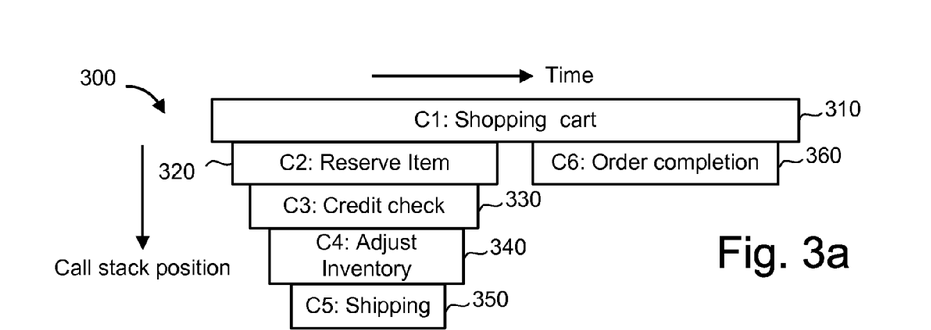
FIG. 3a depicts an example call stack depth versus time representation of a sequence of components invoked in a transaction, based on the sequence of components of FIG. 2.

FIG. 3a depicts an example call stack depth versus time representation of a sequence of components invoked in a transaction, based on the sequence of components of FIG. 2. The representation may be provided on a user interface, for instance, to allow a user to understand the calling relationships among the component, and to see performance metrics, such as the amount of time consumed by each component. The horizontal direction represents time, while the vertical direction indicates call stack depth or position. A call stack identifies components which have been called or invoked during the execution of one or more programs or threads. In the graphical representation 300, which can be provided on a user interface display, for instance, component C1 (310) is the first or root component of the call stack. Components C2 (320) and C6 (360) are at a second layer of the call stack, and components C3 (330), C4 (340) and C5 (350) are at third through fifth layers, respectively, of the call stack. After C1 begins to execute, at the start of a transaction, C2 is called. After C2 begins to execute, C3 is called. After C3 begins to execute, C4 is called. After C4 begins to execute, C5 is called. After C5, C4, C3, and C2 successively finish executing, C1 calls C6. After C6 finishes executing, C1, and the transaction, finish executing.

Figure 3B:
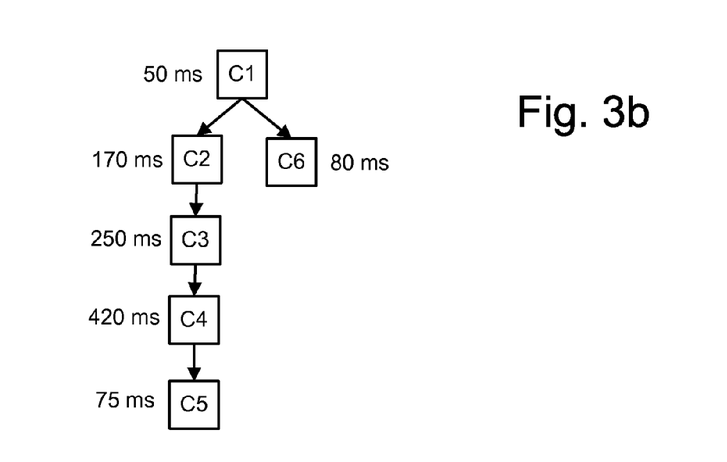
FIG. 3b depicts an example dependency map and performance metrics of a sequence of components invoked in a transaction, based on the sequence of components of FIG. 2.

To obtain a representation which identifies calling relationships/dependencies among components as well as performance metrics, it is necessary to correlate information which is obtained from instrumentation at different components of the network. To achieve this, a correlation identifier (CID) can be provided which passes a name which is reported to the manager and used to construct a dependency map on a user interface, showing caller-callee relationships among components. For example, FIG. 3b depicts an example dependency map of a sequence of components invoked in a transaction, based on the sequence of components of FIG. 2. The map indicates that C1 calls C2 and C6, C2 calls C3, C3 calls C4 and C4 calls C5. The servers associated with each component can report information with the CID to the manager 120 to allow the manager to correlate the different pieces of information. Moreover, the information can include performance metrics as well as an identification of the components, e.g., methods, processes or operations, which were invoked at the servers. For instance, FIG. 3b shows performance metrics as an average method invocation time, in milliseconds (ms), next to each component, e.g., 50 ms for C1, 170 ms for C2 and so forth.

Figure 4:
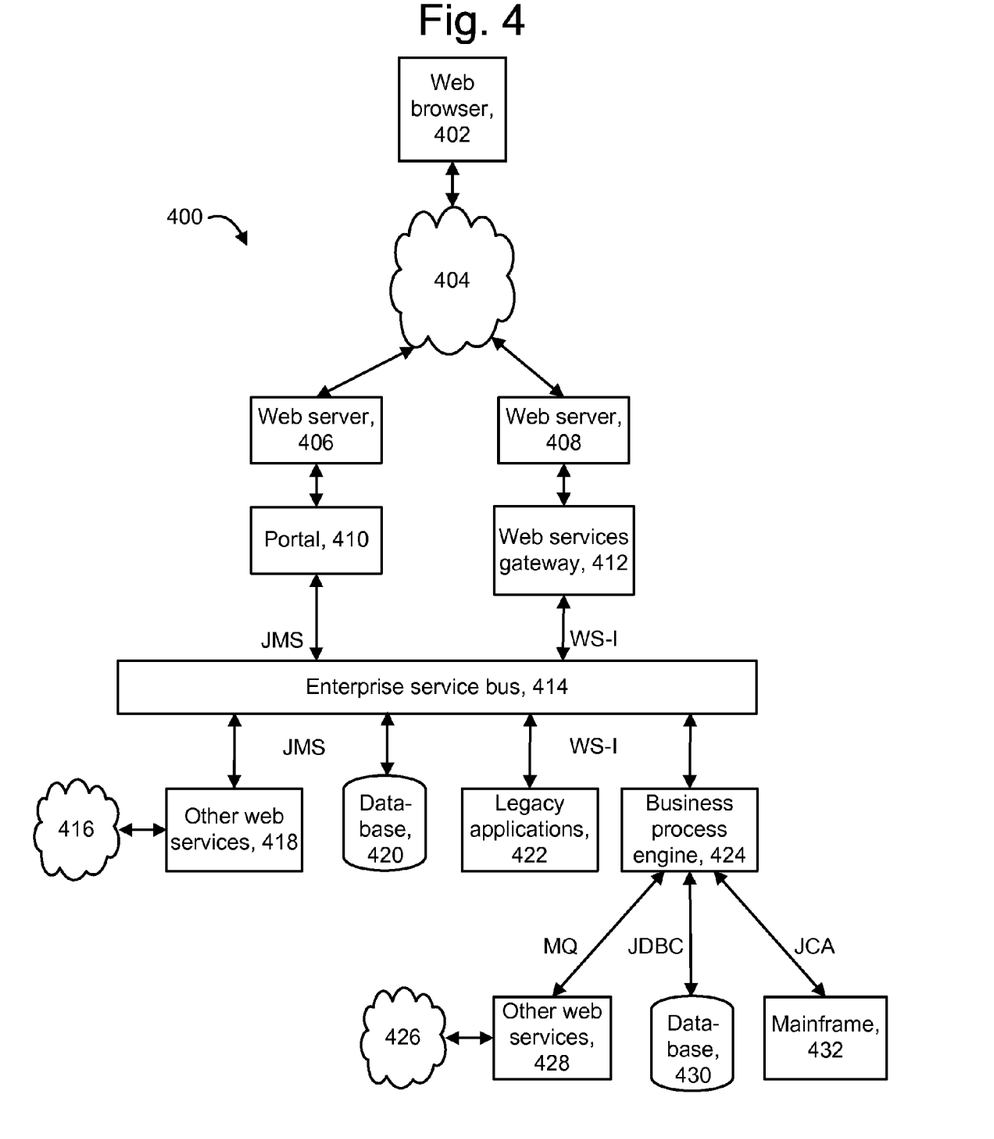
FIG. 4 depicts a network in which a transaction involves various components and protocols.

FIG. 4 depicts a network in which a transaction involves various components and protocols. To properly monitor a transaction, it is necessary to correlate all of the individual elements of the transaction. This is becoming increasingly difficult as transactions often include multiple hops between disparate systems. Not only may application servers of different vendors or at different release levels involved, but different transport protocols (e.g., HTTP or JMS), application protocols (e.g., SOAP or XML-RPC) and implementations (e.g., JAX-RPC or JAX-WS) may also be used. JAX-RPC or JAX-WS are SOAP stack types. HTTP denotes Hyper Text Transport Protocol, JMS denotes Java Message Service, SOAP denotes Simple Object Access Protocol, XML denotes Extensible Markup Language, RPC denotes Remote Procedure Call, JAX denotes Java API for XML, API denotes Application Program Interface and WS denotes Web Services.

SOAP is a protocol specification for exchanging structured information in the implementation of web services in computer networks. It relies on XML as its message format, and usually relies on other Application Layer protocols (such as RPC and HTTP) for message negotiation and transmission. SOAP can form the foundation layer of a web services protocol stack, providing a basic messaging framework upon which web services can be built. SOAP allows for the use of different transport protocols. The standard stack use HTTP as a transport protocol, but other protocols are also usable (e.g., Simple Mail Transfer Protocol or SMTP). SOAP is platform- and language-independent.

In one approach, the capability of a particular protocol is used to pass extra information to correlate transactions, such as by adding an element to a SOAP header. This is depicted in further detail in connection with FIG. 5. However, this approach may not accommodate transactions that involve different application or transport protocols. A solution to this problem should support multiple standard protocols as well as the ability to keep track of transactions that pass through proprietary containers which implement their own correlation schemes, such as Business Process Execution Language (BPEL) engines and process servers. In these cases, a mapping table of correlation identifiers to third party proprietary identifiers has to be created. Techniques provided herein avoid the need for such mapping tables.

In the example network 400, a web browser 402 communicates with web servers 406 and 408 via a network 404. Web Server 406 in turn communicates with a portal 410, which communicates with an enterprise service bus using the JMS protocol. An enterprise service bus refers to a software architecture construct typically implemented by technologies found in a category of middleware infrastructure products, usually based on recognized standards, which provide fundamental services for complex architectures via an event-driven and standards-based messaging engine (the bus). The web server 408 communicates with a web services gateway 412 which in turn communicates with the Enterprise service bus using a Web Services Interoperability (WS-I) protocol. A number of components communicate with the Enterprise service bus 414 from further upstream relative to the web browser 402. The JMS protocol is used by other web services 418, which may also communicate via a respective network 416, and by a database 420. The WS-I protocol is used by legacy applications 422 and a Business process engine 424, which uses a BPEL. The Business process engine 424 in turn communicates with a number of components using different protocols. The MQ protocol is used by other web services 428, which may also communicate via a respective network 426. MQ denotes a message oriented middleware of IBM WEBSPHERE MQ network communication software products. The Java Database Connectivity (JDBC) protocol is used by a database 430. The Java Component Architecture (JCA) protocol is used by a mainframe computer 432, one example of which is the IBM Customer Information Control System (CICS).

A technique for monitoring a transaction across various application components and protocols can include instrumenting an application server such as by using byte code instrumentation. This allows the execution of code at the beginning or end of any method executed within an application by the insertion of calls to trace code. This approach enables the monitoring and modification of information in a flexible manner during the execution of a transaction. Moreover, this approach should be contrasted with proxy-based approaches which can only monitor or modify incoming and outgoing messages, but cannot operate within the application server. This approach also provides a mechanism for multiple protocol support.

Using techniques described herein, either transport or application protocols can be instrumented to obtain correlation information as required, and the correlation information can be transferred between protocols as necessary through a transaction. In an example implementation, the Java Thread-Local construct is used to store correlation information through a transaction from when it is read as part of an incoming message from a client to when it is added to any outgoing request to other services. Besides correlation information, any other type of information at an instrumented point in an application can also be obtained, such as performance metrics.

The number of combinations of protocols, application servers and implementations is such that it is not feasible to supply a pre-built software instrumentation product that covers every possibility. A solution provided here involves flexible tracers. Flexible tracers allow new protocol/application server combinations to be implemented by editing a probe builder file without writing new program code or adding new libraries to the product. Flexible tracers can interpret a Java like syntax and use this to invoke real Java methods. Each application server may run multiple processes and have its own instrumentation.

Figure 5:
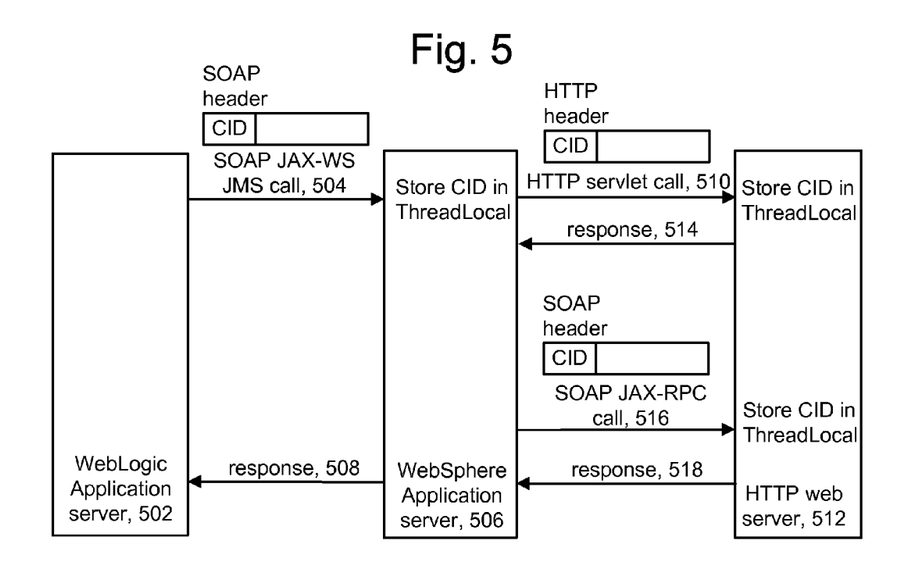
FIG. 5 depicts the communication of a correlation identifier (CID) between servers.

FIG. 5 depicts the communication of a correlation identifier (CID) between servers. A CID allows different portions of a transaction to be correlated with one another by the manager 120. In this example, an ORACLE WebLogic application server 502 sends a call 504 to an IBM WebSphere application server 506 using the SOAP JAX-WS JMS protocols. The call 504 is a message which may include one or more packets whose header includes a CID provided by the server 502. The WebSphere application server 506 stores the CID in Thread-Local, and provides an HTTP servlet call 510 to an HTTP web server 512. In response to the call 510, the HTTP web server 512 stores the CID in ThreadLocal, and provides a response 514. Based on the response 514, the WebSphere application server 506 provides a further call 516, which this time is a SOAP JAX-RPC call, to the HTTP web server 512. In response to the call 516, the HTTP web server 512 stores the CID in ThreadLocal, and provides a response 518. Based on the response 518, the WebSphere application server 506 provides a response 508 to the WebLogic application server 502. The responses typically do not include the CID, but this is an option.

The Oracle WebLogic server is a J2EE application server. The IBM WebSphere Application Server is a software application server which is built using open standards such as Java EE, XML, and Web Services. It works with a number of different web servers. AN example of the HTTP web server 512 is the Apache Tomcat server which is a servlet container developed by the Apache Software Foundation. Tomcat implements the Java Servlet and the JavaServer Pages (JSP) specifications from SUN MICROSYSTEMS, and provides a pure Java HTTP web server environment for Java code to run.

From time to time, each server 502, 506 and 512 can report information with the CID to the manager 120 to allow the manager to correlate the different pieces of information. For example, the information can include performance metrics as well as an identification of the methods and processes which were invoked at the servers. The CID can pass a name which is reported to the manager and used to construct a dependency map on a user interface, showing caller-callee relationships among components, as discussed, e.g., in connection with FIG. 3b. For example, the map could indicate that a method having a name "method1" on server 502 called a method having a name "method2" on server 506, which in turn called a method having a name "method3" on server 512. This could be denoted in various ways, such as by a tree in which method1 is a top node, method2 is a next lower node to method1, and method3 is a next lower node to method2.

Figure 6:
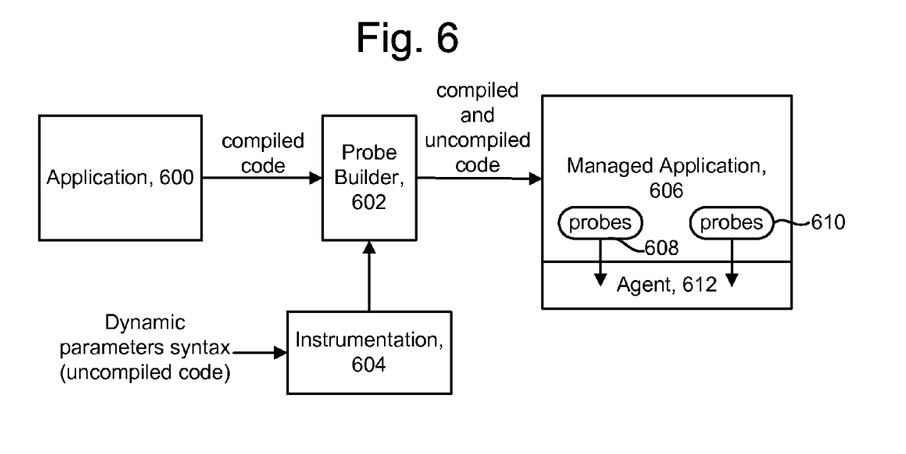
FIG. 6 is a block diagram describing how an application is instrumented.

FIG. 6 is a block diagram describing how an application is instrumented. A transaction may involve executing a method, process, procedure, function, thread, set of instructions, etc. in order to perform a task. A transaction can execute over multiple nodes (e.g., applications) that each execute a portion of the transaction. The system described below can initiate transaction tracing on one, some, or all transactions managed by the system. In one embodiment, the methods in a Java environment are monitored, in which case a transaction involves a method invocation in a running software system that enters the Java Virtual Machine ("JVM") and exits the JVM (and all that it calls).

The system of FIG. 6 instruments the compiled code (also called object code or bytecode) of an application 600. Examples of compiled code include Java byte code and a form of bytecode known as Common Intermediate Language, which is run by the Common Language Runtime (CLR), a core component of MICROSOFT'S .NET framework. A probe builder 602 is responsive to instrumentation 604 to instrument the compiled code of the application by modifying the code to add probes (e.g., probes 608 and 610) and additional code which is needed to create a managed or instrumented application 606. The probes measure specific pieces of information about the application without changing the application's business logic. The probe builder 602 also installs an agent 612 on the same machine as the managed application 606. More information about instrumenting byte code can be found in the above-mentioned U.S. Pat. No. 6,260,187 and US patent publication 2004/0078691, both of which are incorporated herein by reference in their entirety.

The instrumentation 604 uses uncompiled code to provide flexible tracers. The uncompiled code is provided using a Dynamic Parameters Syntax in a probe builder. Flexible tracers allow new protocol/application server combinations to be implemented by editing the probe builder file, without writing and compile new program code or adding new libraries to a pre-built software instrumentation product. This allows a user to add instrumentation to the package after the package has been deployed. Typically, such a package is pre-built by developers who are highly skilled in understanding the software instrumentation product, and then deployed by a purchaser of the software. The package includes hard coded tracers which cannot be modified by the end user. The purchaser has personnel that use the product but are less skilled in understanding it. The techniques provided herein allow such lesser skilled users to add instrumentation by providing a few lines of code using an easily learned syntax which employs familiar constructs. There is no need to request the developers to revise and re-release the package with the additional instrumentation. This provides great cost savings and flexibility to the purchaser. Specifically, flexible tracers can interpret a Java like syntax and use this to invoke real Java methods. The implementation method of the tracers is flexible and can accommodate different protocols. Thus, hard coded tracers can provide a baseline set of instrumentation, while flexible tracers are added as needed for compatibility with particular protocols or as issues arise which cannot be fully resolved by the baseline set of instrumentation.

A flexible tracer can evaluate one or more parameters, and the returned values can be reported to the manager. The parameters can be associated with an invoked method in an application. A method can return any identifier. In one possible implementation, the parameters include a name or namespace and an operation name of the invoked method. These names can be reported to the manager and used to display related metrics. Moreover, the one or more parameters can be used as a correlation identifier (CID), discussed in connection with FIG. 5, which allows different processes at different applications and/or servers to be correlated with one another by the manager. Each process is associated with a respective agent which reports back to the manager. The CID is provided in a call from an invoked method at one process to an invoked method at another process. For example, the CID can be written to the header of a call from a client process to a server process. The CID uniquely identifies a transaction and the location of the current process in a call hierarchy.

In one approach, the flexible tracer is provide by a probe builder file using a name formatter to generate a metric name. One possible implementation of a flexible tracer name formatter involves performing specific coding in the probe builder file at each application server. In this file, the class name and method name can be used as part of the name of a metric, e.g., in the format: foo|bar|{classname}|{method}, where the values in the braces { } are evaluated with runtime information. A task for both the client and server sides is to identify a trace point that can provide the required names. This can be done using the Dynamic Parameters Syntax, which facilitates populating dynamic parameters/properties based on the method invocation data at runtime. These dynamic properties can be used by tracers in any way that is desired. Each dynamic property includes a fixed property name and a dynamic property value that is evaluated for every invocation of the trace point. The Dynamic Parameters Syntax is discussed in further detail below in the Appendix.

Figure 7:
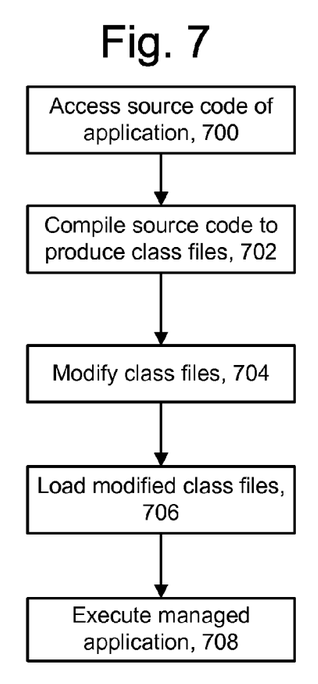
FIG. 7 depicts a process for instrumenting an application.

FIG. 7 depicts a process for instrumenting an application. Note that in this and the other flowcharts, the steps do not necessarily occur discretely and in the sequence indicated, but can occur concurrently at least in part, and in different sequences. Step 700 includes accessing the source code of an application. Step 702 includes compiling the source code to produce compiled code such as Java class files which have a *class extension. Step 704 includes modifying the class files such as by providing uncompiled instructions to add at least one trace point in the application and to evaluate at least one parameter associated with the at least one trace point. The class files are manipulated so that instrumentation instructions are added during preprocessing of the class file bytes. At step 706, the class files are loaded, such as into a Java Virtual Machine (JVM), which interprets the class files during runtime. Once the instrumented class file bytes are loaded, the application server includes a managed or instrumented application which can be executed (step 708).

Generally, source code can be converted to native machine code with a program called a compiler. A compiled language provides fast performance since the compiled instructions load directly into the processor and execute. In addition, the compiler can optimize the program since it looks at the whole program at once rather than simply line by line as with an interpreter. A disadvantage is slower debugging since, after every correction and modification, the program must be recompiled.

Figure 8:
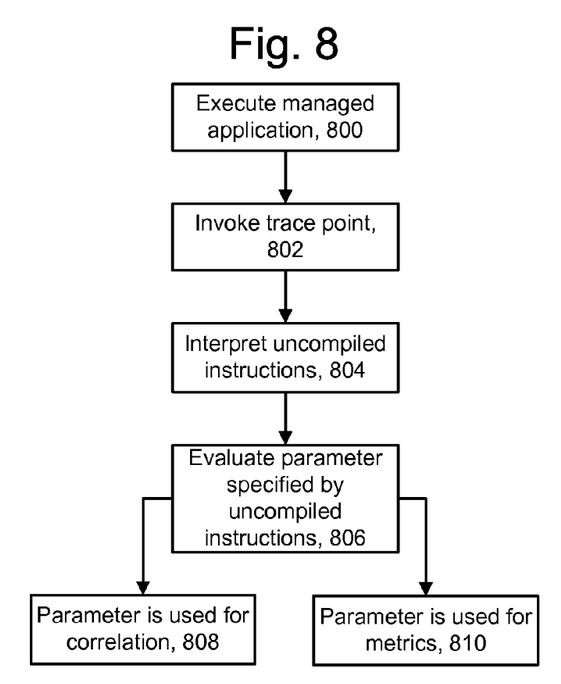
FIG. 8 depicts a process for executing an application.

FIG. 8 depicts a process for executing an application. A managed application is executed at step 800. This includes interpreting compiled and uncompiled code. At step 802, a trace point in the application is invoked. At step 804, the uncompiled instructions are interpreted. This can include interpreting the Dynamic Parameters Syntax which like a script. For example, an interpreter can be provided as an extension to an agent. Generally, an interpreter reads in one line of a program and executes it before going to the next line. The line is first parsed to its smallest component operations and then each operation is executed. The interpreter is normally a program compiled into the local machine code so its operations run at full speed. Scripting languages such as PERL are interpreted. Interpretation simplifies the programming environment since there are no intermediate steps between writing or modifying the code and running it. Results are known immediately, so debugging is fast. A disadvantage is slower performance because the interpreter must read a line, translate it and find the corresponding machine level code, and then execute the instructions. However, this is not problematic when a relatively small number of flexible tracers are added.

At step 806, one or more parameters which are specified by the uncompiled instructions are evaluated. These parameters can be entries which follow the "DynamicParams" keyword in the uncompiled instructions, as described in further detail below in the Appendix. Advantageously, the parameters can be used to capture essentially any runtime data at the time of the trace point invocation and use this data for cross-process correlation (step 808) and/or reporting performance metrics (810), discussed further in connection with FIGS. 9 and 10, respectively.

Figure 9:
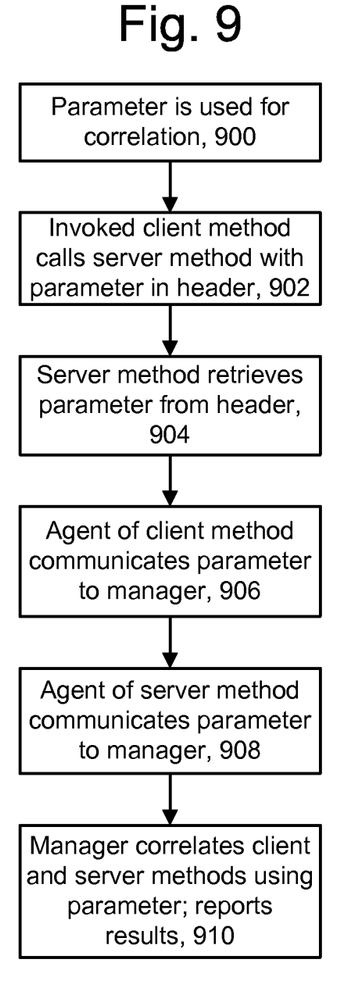
FIG. 9 depicts a process for using a parameter for cross-process correlation.

FIG. 9 depicts a process for using a parameter for cross-process correlation. At step 900, the parameter which is evaluated by the uncompiled instrumentation code is used for correlation. A process can include execution of a number of methods, for example, and can be part of a transaction which extends across multiple processes in respective computing systems or applications. At step 902, an invoked client method calls a server method with a parameter, or more than one parameter, in a header of the call, e.g., as discussed in connection with FIG. 5. At step 904, the server method retrieves the parameter from the header. At step 906, the agent of the client method communicates the parameter to the manager. Note that the agent can communicate data to the manager as soon as the data is received or at specified intervals in a batch mode. An agent can thus accumulate many records of data before communicating them to the manager. Similarly, at step 908, the agent of the server process communicates the retrieved parameter to the manager.

At step 910, the manager correlates the client and server methods using the parameter and can report associated results. The correlation and reporting can occur when a user accesses the user interface 122 (FIG. 1) to view the results. The interface allows the user to view data from specified agents, applications, processes and so forth. Filtering can be performed by specified time intervals in which the application executes. For example, the display of FIG. 3a or 3b can be provided on a user interface to show how different components or processes on different computing systems correlate with one another in a transaction. In this example, the transaction involves purchasing an item from an e-commerce web site, and the different processes are represents by the components C1-C6.

Referring also to FIG. 2, when C1 executes, a parameter can be evaluated with the value or name of "C1," and this can be used as a correlation identifier parameter which is sent to C2. The agent associated with C1, for instance, can send data to the manager which indicates that C1 in a transaction #1 has been invoked. "Transaction #1" can be some globally unique identifier of an occurrence or instance of a transaction. The identifier is created by an agent if it is not found. Similarly, the parameter C1 is recovered at the computing system of C2, and the agent associated with C2 can send data to the manager which indicates that C2 in transaction #1 has been invoked, and C2 was called by C1. The agents can also report respective timestamps which identify the time. This type of information allows the manager to create the display of FIG. 3a or 3b in which C2 is represented as a called component of C1 based on its position below C1. The remaining components C3-C6 can similarly be identified along with their respective caller-callee relationships and invocation start and stop times.

Figure 10:
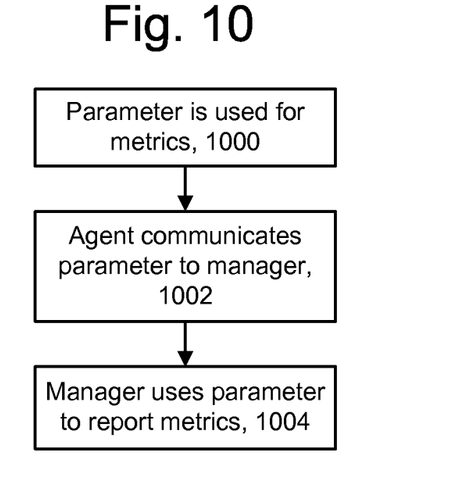
FIG. 10 depicts a process for using a parameter for metrics.

FIG. 10 depicts a process for using a parameter for metrics. At step 1000, the parameter which is evaluated by the uncompiled instrumentation code is used for metrics. At step 1002, the agent communicates the parameter to the manager. At step 1004, the manager uses the parameter to report metrics. Generally, the metrics can include information such as method execution time, average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, the metrics can identify a garbage collection heap size, a bandwidth metric indicating file and socket activity, a number of threads, system logs, exceptions, memory leaks and component interactions. These metrics can be reported using any desired user interface techniques, including a display of numbers, graphs, bar charts or other devices for depicting relative or absolute levels, and so forth.

For example, in FIG. 3a and 3b, assume an execution time of component C1 is determined based on the invocation start and stop times. For each invocation, the parameter can be used to report the method execution time. This execution time can be reported to the manager along with subsequent execution times when the component is again invoked. The manager can then calculate and report an average execution time on the user interface from the individual execution times (FIG. 3b).

Advantageously, one or more parameters can be used to provide both metrics and correlation identifiers, using the same probe builder file.

Figure 11:
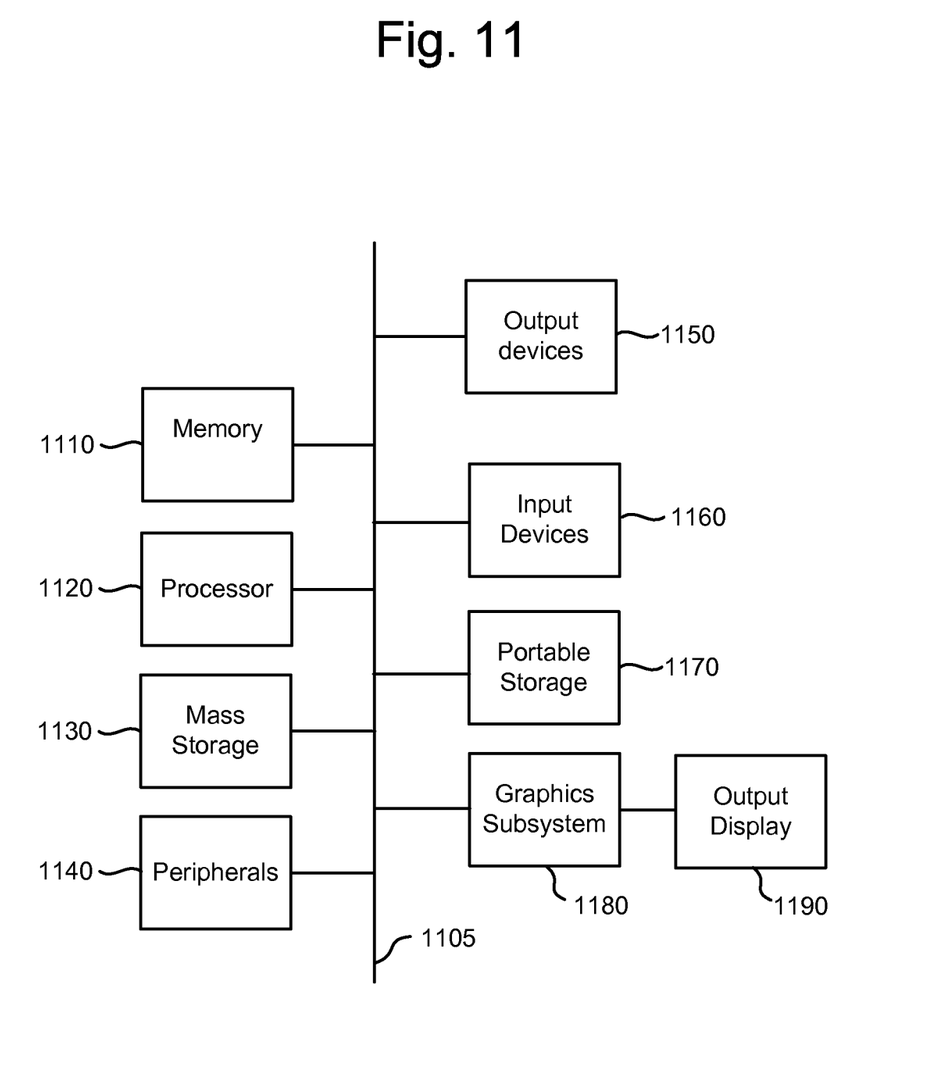
FIG. 11 is a block diagram of an embodiment of a computing system.

FIG. 11 is a block diagram of an embodiment of a computing system. In some embodiments, the computing system is used to implement one or more of web browser 102, Application Servers 106, 110 and 114, and/or Manager Server 120 of FIG. 1. The computer system includes one or more processors 1120 and main memory 1110. Main memory 1110 stores, in part, instructions and data for execution by processor unit 1120. If the system is wholly or partially implemented in software, main memory 1110 can store the executable code when in operation. The system further includes a mass storage device 1130, peripheral device(s) 1140, output devices 1150, user input device(s) 1160, portable storage medium drive(s) 1170, a graphics subsystem 1180 and an output display 1190. For purposes of simplicity, the components are depicted as being connected via a single bus 1105. However, the components may be connected through one or more data transport means. For example, processor unit 1120 and main memory 1110 may be connected via a local microprocessor bus, and the mass storage device 1130, peripheral device(s) 1140, portable storage medium drive(s) 1170, and graphics subsystem 64 may be connected via one or more input/output (I/O) buses. Mass storage device 1130, which may be implemented with a magnetic disk drive or an optical disk drive, is a non-volatile storage device for storing data and instructions for use by processor unit 1120. The mass storage device 1130 can store the system software for implementing the functionality described here for purposes of loading to main memory 1110.

Portable storage medium drive 1170 operates in conjunction with a portable non-volatile storage medium, such as a floppy disk, to input and output data and code to and from the computer system. System software for implementing embodiments is stored on such a portable medium, and is input to the computer system via the portable storage medium drive 1170. Peripheral device(s) 1140 may include any type of computer support device, such as an input/output (I/O) interface, to add additional functionality to the computer system. For example, peripheral device(s) 1140 may include a network interface for connecting the computer system to a network, a modem, a router, etc.

User input device(s) 1160 provides a portion of a user interface, and may include an alpha-numeric keypad for inputting alpha-numeric and other information, or a pointing device, such as a mouse, a trackball, stylus, or cursor direction keys. In order to display textual and graphical information, the computer system includes graphics subsystem 1180 and output display 1190. Output display 1190 may include a cathode ray tube (CRT) display, liquid crystal display (LCD) or other suitable display device. Graphics subsystem 1180 receives textual and graphical information, and processes the information for output to display 1190. Additionally, the system includes output devices 1150 such as speakers, printers, network interfaces, monitors, etc.

The components contained in the computer system are those typically found in computer systems suitable for use with embodiments, and are intended to represent a broad category of such computer components that are well known in the art. Thus, the computer system can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

APPENDIX

Java Hard Coded Tracer Equivalent to a Flexible Tracer

The entries in flexible tracers can be interpreted as Java method calls, which are invoked via reflection. The Java Reflection API is commonly used by programs which require the ability to examine or modify the runtime behavior of applications running in the Java virtual machine. A hard coded tracer equivalent is effectively the same as a flexible tracer, but will run faster. Because reflection involves types that are dynamically resolved, certain Java virtual machine optimizations can not be performed. Consequently, reflective operations have slower performance than their non-reflective counterparts. The hard coded or fixed tracer code snippet provided below for illustrative purposes is an approximate Java equivalent to the full flexible tracer snippet above (Example #2).

```
public void myTracer(MessageContext messagecontext){
OperationDesc
Local_Operation=messageContext.getOperationName( );
Local_Operation.getElementQName( ).getNamespaceURI( );
String operationName = Local_Operation.getName( );
Here, messageContext.getOperation( ) is the equivalent of
InvocationParam-0, which is the first parameter to invoke the method of
IdentifyClassAs:
com.ibm.ws.webservices.engine.handlers.WrappedHandler in the flexible
tracer code.
```

1. Constructing Flexible Correlation Tracers

To achieve the correlation, the flexible tracer is configured in the probe builder file on the client to insert correlation information into the header, and on the server side to read this information. A flexible correlation tracer can use reserved strings (section 1.1 below) and three base flexible correlation tracers (section 1.2 below).

1.1 Reserved Strings Used in Correlation Tracers

Flexible correlation tracers substitute reserved strings which the user enters in the probe builder file for actual values that change as a message moves across a transaction. The reserved strings are:

1. CORRELATION_NAMESPACE: This string is substituted by the tracers with a URL such as http://www.companyname.com. When storing correlation information in the SOAP header, for instance, a namespace is required. The URL contains characters that cannot be entered in the probe builder file, so a substitution is required. This string can be used for any correlation mechanism, including SOAP-based mechanisms.

2. Local_CorrelationId: This string is read by the tracers and is expected to contain the correlation ID. When the correlation ID is obtained during the trace, it is stored in Local_CorrelationId. For example, in the snippet below, the correlation id (if found) is stored in Local_CorrelationId, which the tracer will then store in the agent memory cache: DynamicParams Local_CorrelationId=InvocationParam-0.getHeader (java.lang.String CorID?);

3. correlationid: This string is substituted with a correlation ID (either from the agent memory cache or a newly created ID), before the Dynamic Parameter code is interpreted as Java code and executed.

4. Local_EMPTY_STRING: This string allows the empty string " " to be expressed as a parameter or a result.

5. WSCorIDSOAPHeader: This string is the name that is used for naming SOAP header elements to ensure interoperability.

6. CorId: This is the attribute name for the correlation ID that is used to ensure interoperability.

7. DoProcessing: This string stops processing if the transport medium such as the SOAP header is not found. For example, if a particular transport or SOAP/XML layer header data structure is empty, we know that further processing is not required.

1.2 Flexible Tracers Used for Correlation

The following three tracers may be provided.

1. WSClientFlexibleStartCorrelationTracer: Stores client correlation information on the start Trace. This tracer operates on the start of the trace (on the invocation). It updates the outgoing message with the correlation ID. The ID is typically stored in the SOAP or HTTP header or as a JMS attribute. This tracer can be set up in the probe builder file by providing:

a) A trace point; and b) Flexible tracing code that: (i) for HTTP or SOAP creates an appropriate data structure to place in the header and updates the header, and (ii) for JMS adds an appropriate attribute.

In the following example, a new child element is added to the SOAP header with the appropriate name and namespace, the correlation ID is set as an attribute, and an appropriate namespace declaration is added. The corresponding code is between "###" tags, which do not form part of the code.

```
TraceOneMethodWithParametersIfFlagged:
WASWSClientFlexibleTracing invokeEngine
WSClientFlexibleStartCorrelationTracer "{DynamicParams
Local_Envelope=InvocationParam-
0.getMessage( ).getSOAPPart( ).getEnvelope( );
###Local_Header=Local_Envelope.getHeader( );Local_HeaderElement=
Local_Header.addChildElement(java.lang.String
WSCorIDSOAPHeader###
java.lang.String Local_EMPTY_STRING java.lang.String
###CORRELATION_NAMESPACE);Local_Temp=
Local_HeaderElement.setAttribute(java.lang.String CorId
java.lang.String correlationid);
Local_Temp2=
Local_HeaderElement.addNamespaceDeclaration(java.lang.-
String Local_EMPTY_STRING java.lang.String
CORRELATION_NAMESPACE);}"###
```

2. WSClientFlexibleFinishCorrelationTracer: Stores client correlation information on the finishTrace. This tracer operates on the finish of the trace (the return from a method). It updates the outgoing message with the correlation ID. The ID is typically stored in the SOAP or HTTP header or as a JMS attribute. This tracer can be set up in the probe builder file by providing:

a) A trace point; and b) Flexible tracing code that: (i) for HTTP or SOAP creates an appropriate data structure to place in the header and updates the header, and (ii) for JMS adds an appropriate attribute.

In the following example, the correlation ID is set as a property called CorID in the HTTP header. The corresponding code is between "###" tags, which do not form part of the code.

```
TraceOneMethodWithParametersIfFlagged:
###WilyClientGenericHttpTracing### setRequestProperties
WSClientFlexibleFinishCorrelationTracer "{DynamicParams
###Local_CorrelationId=InvocationParam-
2.getRequestProperty(java.lang.String CorID);
Local_temp=Local_CorrelationId!= Local_EMPTY_STRING OR
```

-continued

```
InvocationParam-2.setRequestProperty(java.lang.String CorID
  java.lang.String correlationid);}"###
```

3. WSServerFlexibleCorrelationTracer: Stores server correlation information on the finish Trace. This tracer operates on the start of the trace. It looks to see if the current header contains a correlation ID. If it does, the correlation ID is placed in the manager's correlation cache. This tracer can be set up in the probe builder file by providing:

a) a trace point; and
b) code about flexible tracing that: (i) searches the header for the correlation ID, and (ii) places the correlation ID in the Local_CorrelationId reserved string.

The following example indicates how flexible tracers can be used to search for an element in the SOAP header that has the correct namespace (http://www.companyname.com) and name (WSCorIDSOAPHeader). The example uses the flexible tracer reserved string DoProcessing to stop processing if the SOAP header is not found. If the SOAP header is found, then the string CorId is extracted, providing the attribute name for the correlation ID.

```
IdentifyClassAs:
com.ibm.ws.webservices.engine.handlers.WrappedHandler
WAS6WSServerTracing
SetFlag: WAS6WSServerFlexibleTracing
TurnOn: WAS6WSServerFlexibleTracing
TraceOneMethodWithParametersIfFlagged:
WAS6WSServerFlexibleTracing invoke
WSServerFlexibleCorrelationTracer "{DynamicParams
Local_Envelope=InvocationParam-
0.getMessage( ).getSOAPPart( ).getEnvelope( );
Local_Element=Local_Envelope.getHeader( ).getChildElement(java.-
lang.String CORRELATION_NAMESPACE java.lang.String
WSCorIDSOAPHeader);DoProcessing=Local_Element!=
Local_EMPTY_STRING;
Local_CorrelationId=Local_Element.getAttributeValue(java.lang.String
Local_EMPTY_STRING java.lang.String CorId);}"
```

1.3 Process of Constructing Flexible Correlation Tracers

The process of constructing correlation tracers involves working with the transport medium and trace points in a particular computing environment to update the probe builder file to include flexible correlation tracers and adding reserved strings as placeholders for the required correlation information. An example process is outlined below.

Step 1: Identify the transport medium for the correlation message (e.g., a SOAP header, HTTP header, or JMS message).

Step 2: Identify a client-side trace point to access the transport medium. This can involve the user investigating the application server code by reading the source code, using a debugger, and/or by forcing exceptions in the application code to identify an appropriate point where desired information can be obtained.

Step 3: Identify a server-side trace point to access the transport medium.

Step 4: Choose a flexible tracer for correlation for both the client and server.

Step 5: Configure flexible correlation tracing by using the reserved strings to update the probe builder file by including one of the client tracers (WSClientFlexibleStartCorrelationTracer or WSClientFlexibleFinishCorrelationTracer) and the server tracer (WSServerFlexibleCorrelationTracer).

Step 6: Test by running a trace and watching the correlation ID and sequence across the calls.

2. Implementing Flexible Tracer Name Formatters

As mentioned above in connection with FIG. 6, one possible implementation of a flexible tracer name formatter involves performing specific coding in the probe builder file at each application server. In this file, the class name and method name can be used as part of the name of a metric, e.g., in the format: foo|bar|{classname}|{method}, where the values in the braces { } are evaluated with runtime information. Three examples of this technique follow.

Example 1

```
# Flexible tracer implementation
IdentifyClassAs:
com.ibm.ws.webservices.engine.handlers.WrappedHandler
WAS6WSServerTracing
SetFlag: WAS6WSServerFlexibleTracing
TurnOn: WAS6WSServerFlexibleTracing
TraceOneMethodWithParametersIfFlagged:
WAS6WSServerFlexibleTracing invoke
WSFlexibleBlamePointTracer1
"WebServices|Server|###{DynamicParams
namespace=InvocationParam-0.getOperation( ).getElementQName( ).-
getNamespaceURI( );}"###
```

IdentifyClassAs: com.ibm.ws.webservices.engine. handlers.WrappedHandler is a method for which the flexible tracer is being provided. This example involves a new trace point, although, alternatively, an existing trace point could be used. A flag is then set and turned on, and the tracing is invoked. The Dynamic Parameter Syntax code is between "###" tags, which do not form part of the code. The DynamicParams entry, namespace, is then evaluated. InvocationParam-0 is the first parameter to invoke the method, getOperation( ) is a Java method which returns the method name, .getElementQName( ) is a Java method which returns the qname of a SOAPElement object (QName is a constructor specifying a local part), and .getNamespaceURI( ) is a Java method which gets the Namespace URI bound to a prefix in the current scope. The keyword DynamicParams signals that the subsequent entry or entries are to be evaluated when the associated method (trace point) is invoked.

Example 2

This example uses the operation name and namespace variables, which are reserved strings used by the WSFlexibleNameFormatter to populate the metric name. For example (the first six lines from example 1 are not repeated):

```
TraceOneMethodWithParametersIfFlagged:
WAS6WSServerFlexibleTracing invoke
WSFlexibleBlamePointTracer2
"WebServices|Server|###{DynamicParams
Local_Operation=InvocationParam-0.getOperation( );
operationname=Local_Operation.getName( );
namespace=Local_Operation.getElementQName( ).-
getNamespaceURI( );}"###
```

The WSFlexibleNameFormatter interprets the dynamic parameter code to obtain the service name/operation name. The Dynamic Parameter Syntax code is between "###" tags, which do not form part of the code. Here, DynamicParams has three entries. The first entry indicates that InvocationParam-0.getOperation( ), described above, is to be assigned to Local_Operation, which indicates that the result is stored in a local variable for performance efficiency. The second entry indicates that operationname assumes a value based on Local_Operation and getName( ), which is a Java method that returns the fully-qualified name of the entity (class, interface, array class, primitive type, or void) represented by this class object, as a string. The third entry indicates that namespace assumes a value based on Local_Operation, getElementQName( ) and getNamespaceURI( ), discussed previously.

Example 3

When applicable, this code can be used to improve performance when the operation name and the namespace require some common calculation: (InvocationParam-0.getOperation( )). The result is stored in a local variable (all local variables start with Local_) for performance efficiency. This local variable is then used to obtain both the operation name and namespace values. An example follows (the first six lines from Example 1 are not repeated). The Dynamic Parameter Syntax code is between "###" tags, which do not form part of the code.

```
TraceOneMethodWithParametersIfFlagged:
    WAS6WSServerFlexibleTracing invoke
    WSFlexibleBlamedFaultTracer2
    "WebServices|Server|###{DynamicParams
    Local_Operation=InvocationParam-0.getOperation( );
    operationname=Local_Operation.getName( );
    namespace=Local_Operation.getElementQName( ).-
getNamespaceURI( );}:
        Errors Per Interval"###
```

3. Dynamic Parameters Syntax

The syntax can include logic for creating dynamic properties based on:
1. Method invocations on:
   a. the "InvocationObject" that is being traced.
   b. the "InvocationClass" itself.
   c. the "Invocation parameters" that the method being traced gets as input arguments.
   d. The "InvocationReturn," in case of methods that have a return value.
2. Simple operator evaluations (==, !=<, <=,>, >=) on the result of the above method invocations against:
   a. The result of other method invocations.
   b. Numbers.
   c. Booleans.
   d. Strings.
3. Binary operator evaluations (AND and OR) on any of the above (1 and 2) which return a Boolean value. The syntax can be specified as part of the "metric name specification" towards the end of the "directive" specification in a probe builder directive (PBD) file. For example, if the directive is:

```
"TraceOneMethodWithParametersIfFlagged:
    SimpleAsyncCorrTracing processRequest SimpleTxTraceDecorator
    "Async|{classname}|{method}"
```
then, the Dynamic Parameters Syntax will be part of the metric name specification: "Async|{classname}|{method}."

Some of the rules for specifying the syntax are:
1. The entire syntax can be specified within a pair of curly braces { } as part of the metric name specification.

2. The syntax can begin with the keyword DynamicParams followed by a space, followed by any number of dynamic parameters entries. The keyword signals that at least one entry follows which is to be evaluated when the trace point is invoked to provide a value for the entry.
3. The syntax can include one or more dynamic parameters entries, each of which is delimited by a semi-colon(;).
4. Each DynamicParam entry includes a name-value pair separated by the equal sign (=).
5. Example rules for the name of the dynamic parameter are:
   a. The name of the parameter is what gets displayed as the property name on a user interface such as in a transaction trace or caller-callee tree (FIGS. 3a and 3b).
   b. Some special instances of the name are:
      i. A name beginning with "Local_" is used as an in-memory variable and is not published in the dynamic properties.
      ii. The same name can be used multiple times, which has the effect of concatenating the values from the multiple DynamicParam entries. This is especially useful in cases where a correlation id needs to be built from multiple method invocations.
6. The value part of the DynamicParam can contain:
   a. A simple String to be directly published as the value, for example, StallTimeout=500, where "500" is a value in ms or other time units.
   b. An invocation object followed by methods to be invoked on this object. Methods are delimited by ".". Each method can have parameters passed, if required. These would be space separated paramType, paramValue entries. There can be multiple methods invoked on this object sequentially. This object can be one of:
      i. InvocationObject: This points to the actual object on which the tracer is currently acting on. This is always available.
      ii. InvocationClass: This points to the class of the actual object on which the tracer is currently acting on. This is always available.
      iii. InvocationParam-i: This exposes the parameters accepted by the method being traced by the tracer. These will be available as InvocationParam-0, InvocationParam-1 and so on, depending on the number of parameters that the instrumented method accepts. These are available if the probe builder file allows parsing of method parameters. For example:

```
"TraceOneMethodWithParametersIfFlagged" or
"TraceAllMethodsWithParametersIfFlagged."
``` iv. InvocationReturn: This points to the return value from the method to which the tracer is applied. This is available only if the method has a return value.
      v. Local Variable: These can be pointers to DynamicParam entries of type "Local," specified in the syntax prior to this DynamicParam definition. This allows this DynamicParam to use the in-memory variables for this current invocation.
   c. An evaluation of the return value from method invocations using relational operators (==, !=, <=, <, >=, >). It is possible to add an operator followed by a value to evaluate the value from method invocations against the specified value. The specified value can be one of
      i. Return value from another method invocation.
      ii. Boolean.

iii. Number.
iv. String.
Some rules for the operators are:
  i. The supported operators for number comparison are: ==, !=, <=, <, >=, > followed by the number value. For example, >=200.
  ii. The supported operators for object comparison are == and != against null values.
  iii. The supported operators for String comparison are == and != against non-number String values.
  iv. Boolean comparison can also supported. Strings true and false should be used when comparing Booleans. For example, . . . == true or . . . != false.
  v. The supported operators for comparing two method invocations depend on the return values of the two methods.
d. An evaluation of two entries of "b" or "c" above using logic operators (AND and OR). The AND and OR operators can be applied between two values from the following categories:
  i. Method evaluation resulting in a Boolean value.
  ii. Relational Operator evaluation.
  For example: DoProcessing=InvocationParam-0.getABC( ).getMyType( ) != NotAllowed AND InvocationParam-0.getABC( ).handleMoreRequests( )== true.
  Example: IsError=InvocationParam-0.getABC( ).getResponseCode( )==401 OR InvocationParam-0.getABC( ).getResponseCode( )==501 OR InvocationParam-0.getABC( ).getResponseCode( )>600.
  7. All "DynamicParam" entries in the syntax are evaluated in the context of the method invocation as specified by the tracer.
3.1 Example Syntax Definition
An example of a syntax definition applied to a tracing directive in the probe builder file is:

```
{DynamicParams Local_ABC=InvocationParam-0.getABC( );
CorMyId=Local_ABC.getMyId( );
MyName=Local_ABC.getMyName( );}
```

3.1.1 Creating Local Variables:
Example: Local_ABC=InvocationParam-0.getABC( ). The Object is InvocationParam-0, meaning that it is the first parameter of the traced method. The method getABC( ) will be invoked on the Object and its return value will be stored in the LocalVariable "Local_ABC".

3.1.2 Populating Dynamic Properties by Direct Invocation:
Example: CorMyId=InvocationParam-0.getABC( ).getMyId( ). The method getABC( ) is invoked on the InvocationParam-0 (which is the first parameter in the method signature) followed by invoking the getMyId( ) on the result. The return value will be stored against the parameter CorMyId.

3.1.3 Populating Dynamic Properties by Invoking Method on a Local Variable:
Example: MyName=Local_ABC.getMyName( ). The value from the method invocation getMyName( ) on localobject "Local_ABC" will be populated as the dynamic property: "MyName"

3.1.4 Populating Dynamic Properties by Evaluating Operators:
Example: DoProcessing=Local_ABC.getMyName( ).getMyType( ) !=NotAllowed. The value from the method invocations Local_ABC.getMyName( ).getMyType( ) will be evaluated to be "not equal" to String "NotAllowed". The resulting Boolean value will be populated as the dynamic property: "DoProcessing" IsError=InvocationParam-0.getABC( ).getResponseCode( )==401. This will evaluate to true if the value from InvocationParam-0.getABC( ).getResponseCode( ) evaluates equal to the numeric value "401."

3.1.5 Populating Dynamic Properties by Using Logic Operators:
Example: DoProcessing=InvocationParam-0.getABC( ).getMyType( )!=NotAllowed AND InvocationParam-0.getABC( ).handleMoreRequests( )==true. This will evaluate to true if both the evaluations are true.
Example: IsError=InvocationParam-0.getABC( ).getResponseCode( )==401 OR InvocationParam-0.getABC( ).getResponseCode( )==501 OR InvocationParam-0.getABC( ).getResponseCode( )>600. This will evaluate to true if any of the conditions is true.

3.1.6 Populating Dynamic Properties by Using Multiple AND/OR Logic Operations:
Complex AND/OR evaluations can be performed using multiple local variables.
Example: IsError=InvocationParam-0.getABC( ).getResponseCode( )==401 OR InvocationParam-0.getABC( ).getResponseCode( )==501 OR InvocationParam-0.getABC( ).getResponseCode( )>600.
Example: DoProcessing=InvocationParam-0.getABC( ).handleMoreRequests( )== true AND IsError != true The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:
1. A computer-implemented method for instrumenting an application, comprising:
  editing a probe builder file in a software instrumentation product by adding uncompiled instructions to the probe builder file, the probe builder file comprising tracers for an application, and the uncompiled instructions specify one trace point in the application, a parameter to evaluate at the one trace point, and an operator for at least one of number comparison, object comparison, string comparison or Boolean comparison;
  using the probe builder file, creating an instrumented application comprising: compiled code of the application, the compiled code is modified to add the tracers, and the uncompiled instructions, the uncompiled instructions provide a tracer which augments the tracers in the software instrumentation product;
  executing the instrumented application;
  when the one trace point is invoked in the instrumented application, in a client process of a transaction, interpreting the uncompiled instructions and, in response, providing a value for the parameter by applying the operator to a first value and a second value, the first value is based on an invoked method at the one trace point and the second value is based on an invoked method at another trace point;
  providing the parameter in a call from the client process to a server process; and communicating the parameter to a manager, the manager uses the parameter to correlate the client and server processes as being part of the transaction.

2. The computer-implemented method of claim 1, wherein: a first agent associated with the client process performs the communicating, and a second agent associated with the server process retrieves the parameter from the call and communicates the parameter to the manager.

3. The computer-implemented method of claim 1, wherein: the executing the instrumented application comprises interpreting the uncompiled instructions as script instructions.

4. The computer-implemented method of claim 1, wherein: the parameter comprises an input argument of the invoked method at the one trace point.

5. The computer-implemented method of claim 1, wherein: the uncompiled instructions comprise a name of a method to be invoked at the one trace point.

6. The computer-implemented method of claim 1, wherein: the value comprises a return value of the invoked method at the one trace point.

7. The computer-implemented method of claim 1, wherein: the parameter comprises a name of a class of an object which is invoked at the one trace point.

8. The computer-implemented method of claim 1, wherein: the parameter comprises a name of a class of an object which is invoked at the one trace point, and a name of a method to be invoked on the class.

9. The computer-implemented method of claim 1, wherein: the uncompiled instructions comprise a keyword in a Dynamic Parameter Syntax, the keyword signals that an entry for the parameter follows and is to be evaluated when the one trace point is invoked to provide the value for the parameter.

10. The computer-implemented method of claim 1, wherein:
the parameter comprises a reserved string which is substituted with at least one of a name or a namespace associated with the one trace point when the one trace point is invoked.

11. The computer-implemented method of claim 1, wherein: the parameter is evaluated with an operation name of the invoked method at the one trace point when the one trace point is invoked.

12. The computer-implemented method of claim 1, wherein:
the parameter provides at least one of a class name and a method name of a performance metric.

13. A processor readable storage device comprising processor readable code embodied thereon for programming a processor to perform a method for instrumenting an application, the method comprising:
editing a probe builder file in a software instrumentation product by adding uncompiled instructions to the probe builder file, the probe builder file comprising tracers for an application, and the uncompiled instructions specify one trace point in the application, a parameter to evaluate at the one trace point and an operator for at least one of number comparison, object comparison, string comparison or Boolean comparison;
using the probe builder file, creating an instrumented application comprising: compiled code of the application, the compiled code is modified to add the tracers, and the uncompiled instructions, the uncompiled instructions provide a tracer which augments the tracers in the software instrumentation product, and the tracers in the software instrumentation product provide a baseline set of instrumentation;
executing the instrumented application;
when the one trace point is invoked in the instrumented application, in a client process of a transaction, interpreting the uncompiled instructions and, in response, providing a value for the parameter by applying the operator to a first value and a second value, the first value is based on an invoked method at the one trace point and the second value is based on an invoked method at another trace point; and
communicating the parameter to a manager, the manager uses the parameter to correlate the client process and an associated server process as being part of the transaction.

14. The processor readable storage device of claim 13, wherein:
the parameter is evaluated with a return value of the invoked method at the one trace point.

15. The processor readable storage device of claim 13, wherein:
the parameter provides at least one of a class name or a method name for a metric of the transaction; and
the manager uses the parameter to report the metric of the transaction.

16. The processor readable storage device of claim 13, wherein:
the parameter is evaluated with an operation name of the invoked method at the one trace point when the one trace point is invoked.

* * * * *